US010706394B2

(12) United States Patent
Arora

(10) Patent No.: US 10,706,394 B2
(45) Date of Patent: Jul. 7, 2020

(54) METHOD AND SYSTEM FOR PROCESSING PAYMENT USING A GENERIC GIFT CARD

(71) Applicant: Mastercard International Incorporated, Purchase, NY (US)

(72) Inventor: Ankur Arora, New Delhi (IN)

(73) Assignee: MASTERCARD INTERNATINOAL INCORPORATED, Purchase, NY (US)

( * ) Notice: Subject to any disclaimer, the term of this patent is extended or adjusted under 35 U.S.C. 154(b) by 610 days.

(21) Appl. No.: 15/385,165

(22) Filed: Dec. 20, 2016

(65) Prior Publication Data

US 2017/0193473 A1      Jul. 6, 2017

(30) Foreign Application Priority Data

Dec. 31, 2015   (SG) .............................. 10201510799P

(51) Int. Cl.
*G06Q 40/00*       (2012.01)
*G06Q 20/10*       (2012.01)
(Continued)

(52) U.S. Cl.
CPC ......... *G06Q 20/102* (2013.01); *G06Q 20/341* (2013.01); *G06Q 20/38* (2013.01);
(Continued)

(58) Field of Classification Search
CPC .... G06Q 20/102; G06Q 40/12; G06Q 20/341; G06Q 20/40
See application file for complete search history.

(56) References Cited

U.S. PATENT DOCUMENTS 7,494,048 B2 *   2/2009   Gusler ................... G06Q 10/02
                                                        235/379
8,429,047 B2 *   4/2013   Hurst ................... G06Q 20/045
                                                        455/406
(Continued)

FOREIGN PATENT DOCUMENTS

WO     WO-2010143069 A1 *  12/2010    ............. G06Q 20/28
WO     WO-2013045898 A2 *   4/2013    ............ G06Q 20/405

OTHER PUBLICATIONS

Anonymous, "Method for point of service automatic gift card redemption thank you," IP.com No. IPCOM000218179D (Year: 2012).*

(Continued)

*Primary Examiner* — Alexander G Kalinowski
*Assistant Examiner* — William B. Bunker
(74) *Attorney, Agent, or Firm* — Buchanan Ingersoll & Rooney PC

(57) ABSTRACT

Methods and servers are provided for processing payment using a generic gift card. The generic gift card is usable for payment across one or more participating merchants. One of the methods is performed at a server that administers usage of the generic gift card, the method comprises generating a unique code for identifying the generic gift card against which payment will be deducted for purchases made at a selected participating merchant; transmitting the unique code to the selected participating merchant; and calculating and subtracting the purchases made from a balance of the generic gift card in response to receiving from the selected participating merchant an indication of use of the unique code at the selected participating merchant.

13 Claims, 4 Drawing Sheets

(51) Int. Cl.
*G06Q 20/38* (2012.01)
*G06Q 20/34* (2012.01)
*G06Q 20/40* (2012.01)

(52) U.S. Cl.
CPC .......... *G06Q 20/387* (2013.01); *G06Q 20/40* (2013.01); *G06Q 40/12* (2013.12)

(56) References Cited

U.S. PATENT DOCUMENTS

| | | | | |
|---|---|---|---|---|
| 8,768,834 B2* | 7/2014 | Zacarias | ............... | G06Q 20/36 705/41 |
| 10,121,127 B1* | 11/2018 | Isaacson | ............... | G06Q 20/105 |
| 2007/0272736 A1* | 11/2007 | Brooks | ............... | G06Q 20/10 235/379 |
| 2009/0265269 A1* | 10/2009 | Stoecker | ............... | G06Q 20/10 705/39 |
| 2010/0036524 A1* | 2/2010 | Chirco | ............... | G06Q 20/28 700/237 |
| 2010/0200653 A1* | 8/2010 | Wolfe | ............... | G06Q 20/28 235/379 |
| 2010/0325006 A1* | 12/2010 | White | ............... | G06Q 20/105 705/26.1 |
| 2011/0295744 A1* | 12/2011 | Wisniewski | ......... | G06Q 20/105 705/41 |
| 2012/0011066 A1* | 1/2012 | Telle | ............... | G06Q 20/385 705/44 |
| 2012/0191513 A1* | 7/2012 | Ocher | ............... | G06Q 20/387 705/14.1 |
| 2012/0191611 A1* | 7/2012 | Kelly | ............... | G06Q 20/382 705/64 |
| 2012/0221425 A1* | 8/2012 | Bhattacharya | ......... | G06Q 20/02 705/26.1 |
| 2013/0290172 A1* | 10/2013 | Mashinsky | ............ | G06Q 20/12 705/39 |
| 2016/0239827 A1* | 8/2016 | Reddy | ............... | G06Q 20/342 |
| 2016/0267605 A1* | 9/2016 | Lingham | ............... | G06Q 40/12 |
| 2017/0011392 A9* | 1/2017 | Lingham | ............... | G06Q 20/363 |
| 2019/0164147 A1* | 5/2019 | Arnone | ............... | G06Q 40/02 |

OTHER PUBLICATIONS

Lindsey Knerl, "How to Use Up Remaining Balances on Prepaid Gift Cards," //widebread.com; published at Archive.org (Year: 2015).*

* cited by examiner

US 10,706,394 B2

METHOD AND SYSTEM FOR PROCESSING PAYMENT USING A GENERIC GIFT CARD

FIELD OF INVENTION

The following discloses a method and system for processing payment using a generic gift card.

BACKGROUND

Statistics show that gift card is a $400 billion industry in the U.S. alone. However, about 20% of these cards go unused every year.

One possible reason why gift cards go unused may be because of limited acceptance in that they cannot be used at multiple stores or brands. Another possible reason is that, after receipt, customers may forget using the gift cards, or these cards end up being lost. Most likely, customers may receive multiple gift cards of different brands but have difficulty to monitor their respective expiry dates, because such conventional gift cards provide no solution for them to group different gift cards into one for ease of monitoring and management.

There is thus a need for a technical solution to provide a generic gift card that can be used at multiple merchants or multiple brands, and more importantly, to provide a method and a system for processing payment using such a generic gift card. Furthermore, other desirable features and characteristics will become apparent from the subsequent detailed description and the appended claims, taken in conjunction with the accompanying drawings and this background of the disclosure.

SUMMARY

According to a first aspect of the present invention, there is provided a method for processing payment using a generic gift card, the generic gift card being usable for payment across one or more participating merchants, the method being performed at a server that administers usage of the generic gift card. The method comprises: generating a unique code for identifying the generic gift card against which payment will be deducted for purchases made at a selected participating merchant; transmitting the unique code to the selected participating merchant; and calculating and subtracting the purchases made from a balance of the generic gift card in response to receiving from the selected participating merchant an indication of use of the unique code at the selected participating merchant.

According to a second aspect of the present invention, there is provided a method for processing payment using a generic gift card, the generic gift card being usable for payment across one or more participating merchants, the method being performed at a server of a selected participating merchant. The method comprises: receiving, from a server that administers usage of the generic gift card, a unique code for identifying the generic gift card against which payment will be deducted for purchases made at the selected participating merchant, and transmitting, to the server that administers usage of the generic gift card, an indication of use of the unique code, so as to facilitate calculating and subtracting the purchases made from a balance of the generic gift card.

According to a third aspect of the present invention, there is provided a server for administering usage of a generic gift card and processing payment using the generic gift card, the generic gift card being usable for payment across one or more participating merchants. The server comprises: at least one processor; at least one memory including computer program code; and at least one communication interface. The at least one memory and the computer program code are configured to, with at least one processor, cause the server at least to: initialize the generic gift card for payment by generating a unique code for identifying the generic gift card against which payment will be deducted for purchases made at a selected participating merchant; transmit the unique code to the selected participating merchant; and calculate and subtract the purchases made from a balance of the generic gift card in response to receiving from the selected participating merchant an indication of use of the unique code at the selected participating merchant.

According to a fourth aspect of the present invention, there is provided a merchant server for processing payment using a generic gift card, the generic gift card being usable for payment across one or more participating merchants. The merchant server comprises: at least one processor; at least one memory including computer program code; and at least one communication interface. The at least one memory and the computer program code are configured to, with at least one processor, cause the merchant server at least to: receive, from a server that administers usage of the generic gift card, a unique code for identifying the generic gift card against which payment will be deducted for purchases made at the selected participating merchant, and transmit, to the server that administers usage of the generic gift card, an indication of use of the unique code, so as to facilitate calculating and subtracting the purchases made from a balance of the generic gift card at the server that administers usage of the generic gift card.

According to a fifth aspect of the present invention, there is provided a non-transitory computer readable medium having stored thereon executable instructions for controlling a computer to administer usage of a generic gift card and process payment using the generic gift card, wherein the computer is controlled to perform steps comprising: initialising the generic gift card for payment by generating a unique code for identifying the generic gift card against which payment will be deducted for purchases made at a selected participating merchant; transmitting the unique code to the selected participating merchant; and calculating and subtracting the purchases made from a balance of the generic gift card in response to receiving from the selected participating merchant an indication of use of the unique code at the selected participating merchant.

According to a sixth aspect of the present invention, there is provided a non-transitory computer readable medium having stored thereon executable instructions for controlling a computer to process payment using a generic gift card, wherein the computer is controlled to perform steps comprising: receiving, from a server that administers usage of the generic gift card, a unique code for identifying the generic gift card against which payment will be deducted for purchases made at the selected participating merchant, and transmitting, to the server that administers usage of the generic gift card, an indication of use of the unique code, so as to facilitate calculating and subtracting the purchases made from a balance of the generic gift card at the server that administers usage of the generic gift card.

BRIEF DESCRIPTION OF THE DRAWINGS

Embodiments of the invention will be better understood and readily apparent to one of ordinary skilled in the art from the following written description, by way of example only, and in conjunction with the drawings, in which.

DETAILED DESCRIPTION

Figure 1:
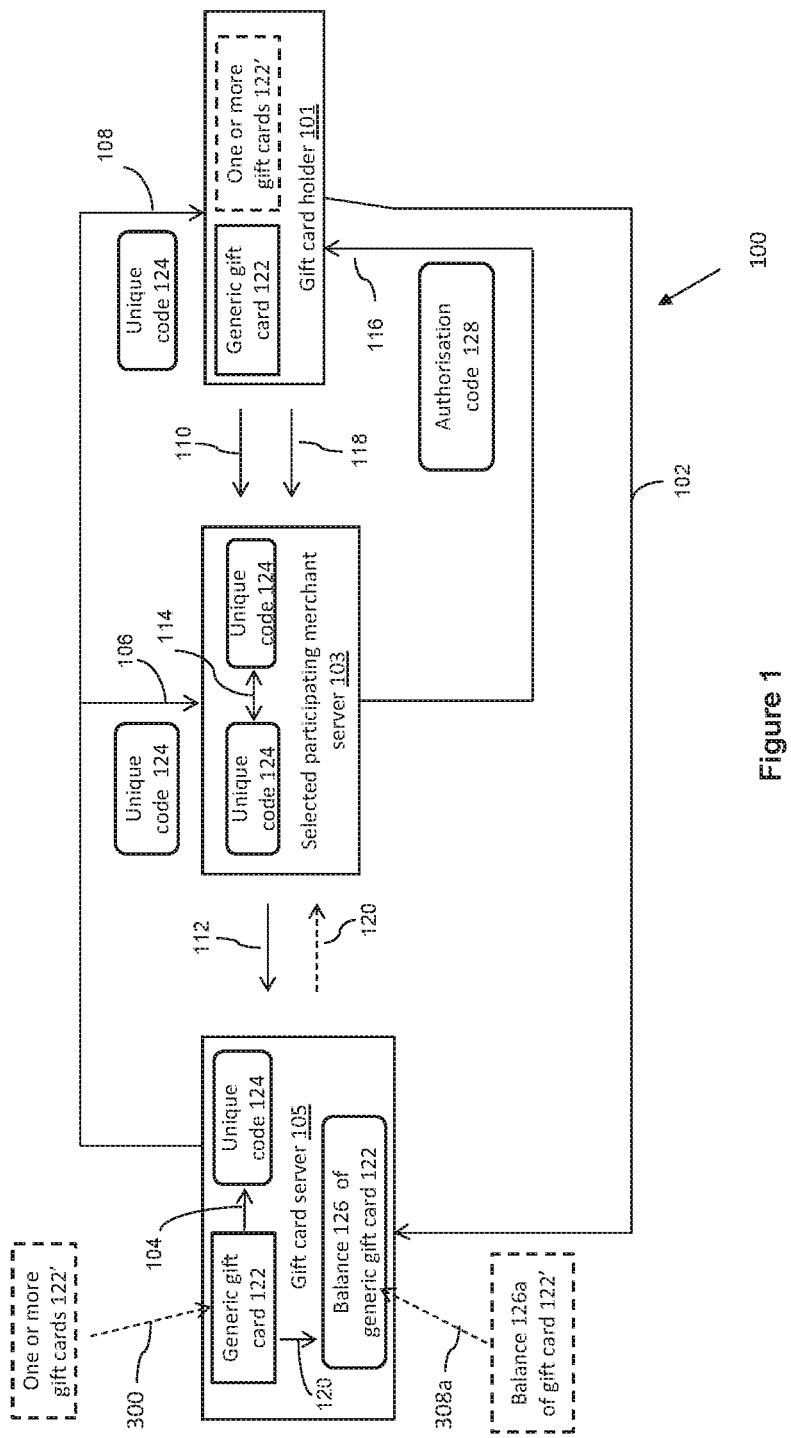
FIG. 1 shows a schematic of a system in which a method for processing payment using a generic gift card may be performed.

Embodiments of the present invention will be described, by way of example only, with reference to the drawings. Like reference numerals and characters in the drawings refer to like elements or equivalents.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "scanning", "calculating", "determining", "replacing", "generating", "initializing", "outputting", or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a computer or other computing device selectively activated or reconfigured by a computer program stored therein. The algorithms and displays presented herein are not inherently related to any particular computer or other apparatus. Various machines may be used with programs in accordance with the teachings herein. Alternatively, the construction of more specialized apparatus to perform the required method steps may be appropriate. The structure of a computer will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a computer. The computer readable medium may also include a hard-wired medium such as exemplified in the Internet system, or wireless medium such as exemplified in the GSM mobile telephone system. The computer program when loaded and executed on such a general-purpose computer effectively results in an apparatus that implements the steps of the preferred method.

In the present application, it will be appreciated by the skilled person in the art that a gift card server is a server that administers usage of generic gift cards. The administration of the usage of generic gift cards comprises: creating generic gift cards in the server, assigning account numbers to the generated generic gift cards, managing balances associated with the account numbers, deducting/debiting amounts from the balances if payments are made using the generic gift cards, crediting values to the balances if top-ups are made to the accounts of the generic gift cards, etc. In the present disclosure, the creation and top-up of a generic gift card in the gift card server may be by virtue of a conversion from one or more conventional gift cards. The generic gift card is a type of gift card whose usage is not limited to a certain number of merchants. In other words, by virtue of the generality of such a type of gift card, the non-acceptance of a gift card among different brands is alleviated.

FIG. 1 illustrates a schematic of a system 100 in which a method for processing payment using a generic gift card may be performed. In the system 100, a gift card holder 101 who holds a generic gift card 122 communicates 102 with a gift card server 105. As indicated above, the usage of the generic gift card 122 is not limited to a certain merchant, i.e. the generic gift card 122 is usable at a merchant that participates in a retailer program to which the generic gift card 122 belongs. The communication 102 may indicate which one or more of these participating merchants the gift card holder 101 wishes that the generic gift card 122 may be used. These one or more merchants are named as a selected participating merchant in the present disclosure. For the sake of simplicity, only one selected participating merchant is considered in the description of the system 100, whereby this selected participating merchant is represented by its server 103 with which the gift card server 105 communicates. The selected participating merchant server 103 processes payment made at the selected participating merchant using the generic gift card 122.

The communication 102 between the gift card holder 101 and the gift card server 105 may be conducted via an application installed in a mobile device of the gift card holder 101. For the simplicity of understanding, such an application and a mobile device are not shown in FIG. 1. The application installed in the mobile device of the gift card holder 101 may communicate directly with the gift card server 105. On the other hand, the application installed in the mobile device of the gift card holder 101 may communicate indirectly with the gift card server 105 using communication packets that are routed through one or more servers (not shown).

Alternatively, the communication 102 between the gift card holder 101 and the gift card server 105 may be through an application (such as a generic internet browser) running on a computer that the generic gift card holder 101 accesses.

The gift card server 105, as mentioned above, is a server that administers usage of generic gift cards. The gift card server 105 may comprise a database that stores details of a plurality of generic gift cards, such as the respective account numbers and the respective balances thereof. For the sake of simplicity, in the embodiment exemplified in FIG. 1, only one generic gift card 122 is shown and its depiction at the gift card server 105 is a representation of the account number assigned to the generic gift card 122. Reference numeral 126 is used to depict the balance of the account number of the generic gift card 122.

Upon receipt, at the gift card server 105, of an indication that the generic gift card holder 101 wishes to use the generic gift card 122 at a selected participating merchant as a method of payment, the gift card server 105 generates 104 a unique code 124. The indication of the generic gift card holder 101 wishing to use the generic gift card 122 is generally undertaken prior to purchase of goods and/or services. This indication may be sent through the communication 102 channel mentioned above. The generation of the unique code 124 initialises the generic gift card 122 for payment in that the assigned account number of the generic gift card 122 is readied to receive a request to have its balance debited for subsequent purchase. This has the effect of activating the assigned account number from a dormant state. The unique code 124 then serves to identify the generic gift card 122 and in turn its assigned account number against which the payment will be deducted for purchases made at the selected participating merchant.

After the unique code 124 is generated, the gift card server 105 transmits 106 the unique code 124 to the selected participating merchant server 103. The unique code 124 may be stored in the selected participating merchant server 103. The selected participating merchant server 103 may comprise a database for storing the received unique code 124. The unique code 124 may also be transmitted 108 to the gift card holder 101. If the gift card holder 101 wishes to make payment through his mobile device (not shown), the unique code 124 may be stored in the mobile device.

Payment using the generic gift card 122 for one or more purchases at the selected participating merchant is done by use of the unique code 124, rather than use of the generic gift card 122. In this manner, the generic gift card 122 need not be on hand when the one or more purchases are made. The verification of the generic gift card 122 may be sought in one or more ways.

In one approach, the gift card holder 101 may verbally indicate 110 the unique code 124 to the selected participating merchant, who subsequently enters the unique code 124 into their in-store system, for example through a Point of Sale (POS) machine. On the other hand, the gift card holder 101 may also manually enter the unique code 124 into the POS machine, if the selected participating merchant has self-check-out counters. The POS machine then relays the unique code 124 to their server 103. The selected participating merchant server 103 may then check in its database whether the unique code 124 provided by the gift card holder 101 tallies with the stored unique code 124, as transmitted 106 from the gift card server 105. If the unique code 124 provided by the gift card holder 101 is identical to the unique code 124 stored in the selected participating merchant server 103, the unique code 124 is authenticated or verified 114. As a consequence of the verification 114, an indication of use of the unique code 124 at the selected participating merchant will be sent 112 from the selected participating merchant server to the gift card server 105.

In another approach, the gift card holder 101 may transmit the unique code 124 using his mobile device to the selected participating merchant sever 103. The mobile device may transmit the unique code 124 using a secure wireless network established by the selected participating merchant server 103 or through a POS machine at the time of check-out. The selected participating merchant server 103 may then check in its database whether the unique code 124 provided by the gift card holder 101 from his mobile device tallies with the stored unique code 124, as transmitted 106 from the gift card server 105. If the unique code 124 provided by the gift card holder 101 from his mobile device is identical to the unique code 124 stored in the selected participating merchant server 103, the unique code 124 is authenticated or verified 114. As a consequence of the verification 114, an indication of use of the unique code 124 at the selected participating merchant will also be sent 112 from the selected participating merchant server to the gift card server 105. Use of the unique code 124 to make payment also has a further advantage of allowing the gift card holder 101 to delegate a third person to make purchases on behalf of the gift card holder 101. In such a scenario, after receiving the unique code 124 from the gift card server 105, the gift card holder 101 may provide the third person with the received unique code 124 for making the payment using the generic gift card 122. The third person may use the unique code 124 for payment for one or more purchases at the selected participating merchant as if the purchases are personally made by the gift card holder 101.

Upon receiving 112 the indication of use of the unique code 124 from the selected participating merchant server 103, the gift card server 105 calculates and subtracts 120 the purchases from the balance 126 of the generic gift card 122. The calculation is based on the value of the goods or services purchased. The subtraction may be realised by the gift card server 105 deducting/debiting the calculated value from the balance 126 of the generic gift card 122. The compensation that the gift card server 105 undertakes to the selected participating merchant server 103 as a result of this deduction/debit is beyond the scope of this disclosure. However, it will be appreciated by the skilled person that the compensation may be conducted via a payment gateway.

In the above, having the selected participating merchant server 103 receive 110 the unique code 124 is sufficient for the selected participating merchant server 103 to send 112 an indication of use of the unique code 124 to the gift card server 105 for processing of the balance 126 of the generic gift card 122 to deduct the made purchases. However, a further authentication may be done before the selected participating merchant server 103 sends 112 indication of use of the unique code 124 to the gift card server 105 as described below.

In the present embodiment shown in FIG. 1, the further authentication may require a second layer of security which may be achieved through the use of an authorization code 128 from the gift card holder 101 for verification 114 of the received unique code 124. The authorization code 128 may be generated by the selected participating merchant server 103 in response to the receipt 110 of the unique code 124 from the gift card holder 101 when the purchases are made at the selected participating merchant. Alternatively, the authorization code 128 may be generated by the gift card server 105 and transmitted 120 to the selected participating merchant server 103 for subsequent verification 114 of the received unique code 124. The selected participating merchant server 103 will send 116 the authorization code 128 to the eligible holder of the generic gift card 122 that is used for payment at the selected participating merchant. If the gift card holder 101 is the eligible holder of the generic gift card 122, the gift card holder 101 will receive 116 the authorization code 128 and transmit 118 it to the selected participating merchant server 103 for verification. Upon receipt 118 of the authorization code 128, the verification 114 of the received unique code 124 is performed. Upon completion of the verification 114, the selected participating merchant server 103 will send 112 the indication of use of the unique code 124 to the gift card server 105. The gift card server 105 will then calculate and subtract 120 the purchases from the balance 126 of the generic gift card 122.

Figure 2:
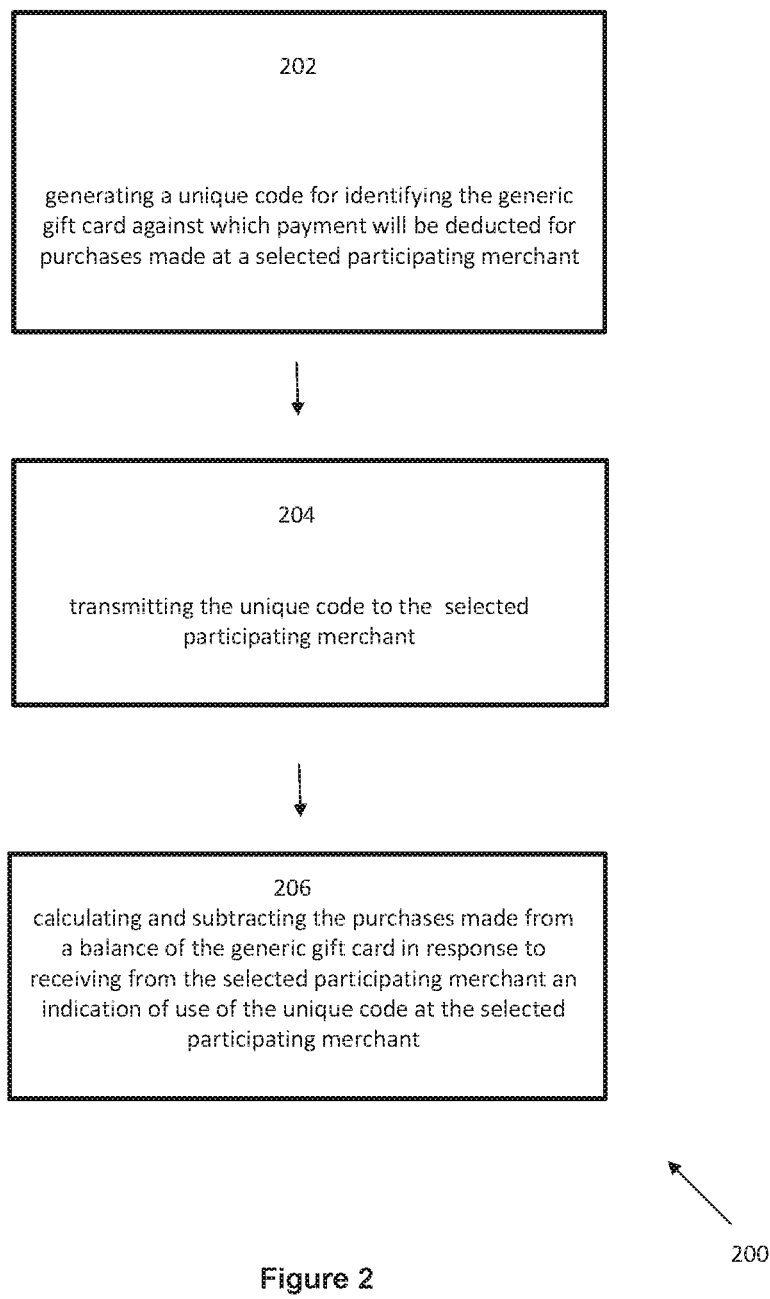
FIG. 2 shows a flowchart depicting steps of a method for processing payment using a generic gift card.

In view of the system 100 for processing payment using the generic gift card 122 as illustrated in FIG. 1 and as described above, FIG. 2 shows a flow chart 200 that exemplifies steps of a method for processing payment using the generic gift card 122.

At step 202, the gift card server 105 initialises the generic gift card 122 for payment by generating 104 a unique code 124 for identifying the generic gift card 122 against which payment will be deducted for purchases made by the gift card holder 101 at the selected participating merchant.

At step 204, the gift card server 105 transmits 106 the unique code 124 to the selected participating merchant. The unique code 124 is also transmitted to the gift card holder 101 for subsequent verification 114 at the selected participating merchant server 103.

At step 206, the gift card server 105 receives 112 from the selected participating merchant an indication of use of the unique code 122 once the verification 114 of the unique code 124 is performed at the selected participating merchant server 103. Upon receipt 112 of the indication of use of the unique code 122 at the selected participating merchant, the gift card server 105 calculates and subtracts 120 the purchases made using the generic gift card 122 from the balance 126 of the generic gift card 122.

Figure 3:
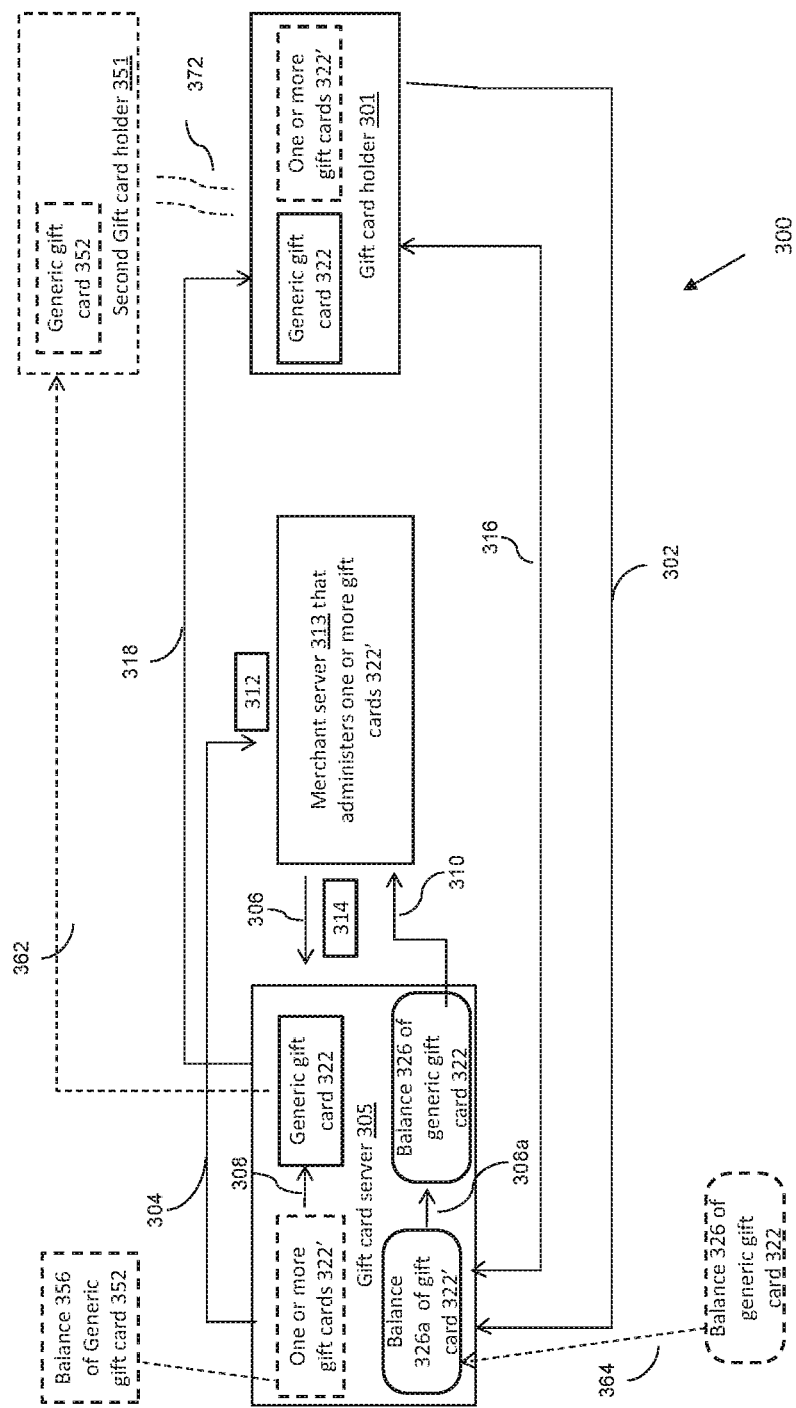
FIG. 3 shows a schematic of an embodiment of a system, as shown in FIG. 1, in which the generic gift card can be converted from one or more gift cards.

FIG. 3 illustrates a system 300 which supports conversion of one or more gift cards 322' to a generic gift card 322. This conversion involves either debiting the one or more gift cards 322' to create a generic gift card 322 (depicted using reference numeral 308); or debiting the one or more gift cards 322' to credit a balance of an existing generic gift card 322 (depicted using reference numeral 308). The one or more gift cards 322' may be purchased by the gift card holder 301 or received by him as presents for an event. The event may be his or her birthday, wedding, baby shower, etc. The one or more gift cards 322' may be conventional gift cards which restrain their usage at certain pre-selected merchants. Where the one or more gift cards 322' are conventional gift cards, the gift card holder 301 may encounter the conventional problem as described above. That is, he does not want to shop at the specific merchants, which leads to non-usage of the one or more gift cards 322' until such cards expire. The system 300 advantageously enables conversion of the one or more gift cards 322' to the generic gift card 322 so that the gift card holder 301 is able to use the generic gift card 322 for payment at one or more merchants 103 selected from a greater pool of participating merchants that accept the generic gift card 322 by processing them for payment as described above in accordance with FIGS. 1 and 2.

The one or more gift cards 322' are issued by a merchant represented by its server 313 that administers issuance and management of its issued gift cards 322'. The gift card holder 301 may send 302 a request to a general gift card portal (not shown) that transmits the request to the gift card server 305. The request is for converting the one or more gift cards 322' to a generic gift card 322 for the gift card holder 301. For the simplicity of understanding, the request is shown as directly transmitted from the gift card holder 301 to the gift card server 305. It can be appreciated by the skilled person in the art that an application may be used to access the general gift card portal, The application may be installed on a mobile device of the gift card holder 301, or on a computing device to which the gift card holder 301 has access, and is configured to communicate with the gift card server 305. The conversion from one or more gift cards 322' to a generic gift card 322 is described below.

The one or more gift cards 322' may each have a respective balance 326*a*. In the present embodiment shown in FIG. 3, the gift card 322' that the gift card holder 301 wishes to convert comprises a balance 326*a*. Upon the gift card server 305 receiving 316 confirmation from the gift card holder 301 for the conversion, the gift card server 305 may check whether the gift card holder 301 already owns a generic gift card 322. If the gift card holder 301 does not own such a generic gift card 322, the gift card server 305 will create 308 the generic gift card 322 and assign an account number to the created generic gift card 322. The balance 326*a* of the gift card 322' is transferred 308*a* to a balance 326 of the created generic card 322. The gift card holder 301 may choose to convert only a portion of the balance 326*a* of each of his one or more gift cards 322' to credit the balance 326 of his generic gift card 322. Should a total balance 326*a* of the one or more gift cards 322' be extracted, this may result in the termination of the one or more gift cards 322'.

The gift card holder 301 may already own a generic gift card 322 assigned to an account recorded in a database of the gift card server 305. Upon receiving the confirmation and approval from the gift card holder 301, the gift card server 305 will extract at least a portion of the balance 326*a* of the one or more gift cards 322' for forming a portion of the balance 326 of the generic gift card 322.

In view of the above, the present application advantageously enables the gift card holder 301 to club his one or more different conventional gift cards which might end up in expiring without being used into a generic gift card that has broader acceptance range.

Upon receiving 302 the request for conversion from the gift card holder 301, the gift card server 305 sends 304 an endorsement request 312 to the merchant server 313 that administers, i.e. issues and/or manages, the one or more gift cards 322'. The endorsement request 312 serves to have the merchant server 313 update their account system to debit/terminate the one or more gift cards 322' that are to be converted. The endorsement request 312 may comprise particulars of the one or more gift cards to be converted.

The endorsement request 312 received at the merchant server 313 is processed to identify the particulars of the one or more gift cards 322' to be converted. The endorsement request 312 at the merchant server 313 also generates an incentive value that the merchant server 313 requires in return of the conversion of one or more gift cards 322' to a generic gift card 322. The incentive value will then be sent back to the gift card server 305 with an endorsement 314 of the conversion from the merchant server 313. Such an endorsement 314 with the incentive value that the merchant server 313 requires from the conversion will be forwarded to the gift card holder 301 for confirmation and approval. It will be appreciated by the skilled person that the endorsement 314 with the incentive value may be shown on an interface (not shown in FIG. 3) of the gift card holder's 301 mobile device. If the gift card holder 301 agrees to pay the incentive value to the merchant 313' that issues one or more gift cards 322', he may click a "yes" button on the interface to confirm and approve the conversion. For simplicity, the forwarding of the endorsement 314 with the incentive value from the gift card server 305 to the gift card holder 301 and the confirmation and approval of the endorsement 314 with the incentive value from the gift card holder 301 to the gift card server 305 are shown in a bidirectional step 316. It will be appreciated by the skilled person that the incentive may be compensated from the gift card holder 301 to the merchant server 313 via a payment gateway.

In lieu of making a payment, the gift card server 305 may deduct/debit 310 the required incentive value from the balance 326 of the generic gift card of the gift card holder 301. The deducted/debited incentive may then be transferred to the merchant server 313.

It will be appreciated to the skilled person that this incentive value mechanism may advantageously promote the circulation of the one or more gift cards 322' that might expire unused because of the non-acceptance at certain brands. Also, the incentive value mechanism advantageously attracts more brands to participate into the retailer program to which the generic gift card 122 belongs, such that different gift cards may be grouped for the ease of monitoring and management.

The system 300 also advantageously enables the generic gift card holder 301 to sell/assign the converted one or more gift cards 322 to another person, referred to as a second gift card holder 351.

It was earlier described that the system 300 enables the gift card holder 301 to convert the one or more gift cards 322' to a generic gift card 322. If an assignment 362 is sought, the gift card server 305 will then transfer the amount of the one or more gift cards 322' from the balance 326 of the generic gift card 322 to a balance 356 of a generic gift card 352 for the second gift card holder 351.

The generic gift card 352 and its balance 356 may be created in the gift card server 305 upon the assignment 362. Alternatively, the assignment 362 may serve as a top-up to the balance 356, which had already been assigned in the gift card server 305, for an already existing generic gift card 352 of the second gift card holder 351.

By virtue of the assignment 362, the second gift card holder 351 is able to use the converted generic gift card 352 for payment at one or more merchants selected from a greater pool of participating merchants that accept the generic gift card 352 by processing them for payment as described above in accordance with FIGS. 1 and 2.

It will be appreciated by the skilled person in the art that, in return of the assignment 362 of the assigned converted generic gift card 352 from the gift card holder 301 to the second gift card holder 351, the second gift card holder 351 returns/pays 372 an agreed consideration to the gift card holder 301. The agreed consideration to the gift card holder 301 may be returned 372 via a payment network. The mechanism of the payment network is appreciated by the skilled person in the art and is not further described here. As an alternative of agreed consideration, the assignment 362 of the converted generic gift card 352 may be a gift from the gift card holder 301 to the gift card holder 351 without the payment 372.

Upon the assignment 362 from one or more gift cards 322' to the generic gift card 352, and the balance 326a or a portion of the balance 326a of one or more gift card 322' is transferred to the balance 326 of the generic gift card 322, the gift card server 305 may credit 310 the incentive value, that the merchant server 313 requires, to the merchant server 313 from the gift card holder 301. In addition, the gift card server 305 will inform the particulars of the generic gift card 352 to the second gift card holder 351.

With respect to the payment of the incentive value, where the gift card holder 301 owns a generic gift card 322 that has a sufficient balance 326 as recorded in a database of the gift card server 305, upon receiving the confirmation and approval from the gift card holder 301, the gift card server 305 will extract the incentive value required by the merchant server 313 from the balance 326 of the generic gift card 322.

Alternatively, it will be appreciated by the skilled person that the payment of the incentive value may be conducted by an established payment network similar to the payment network 372.

Figure 4:
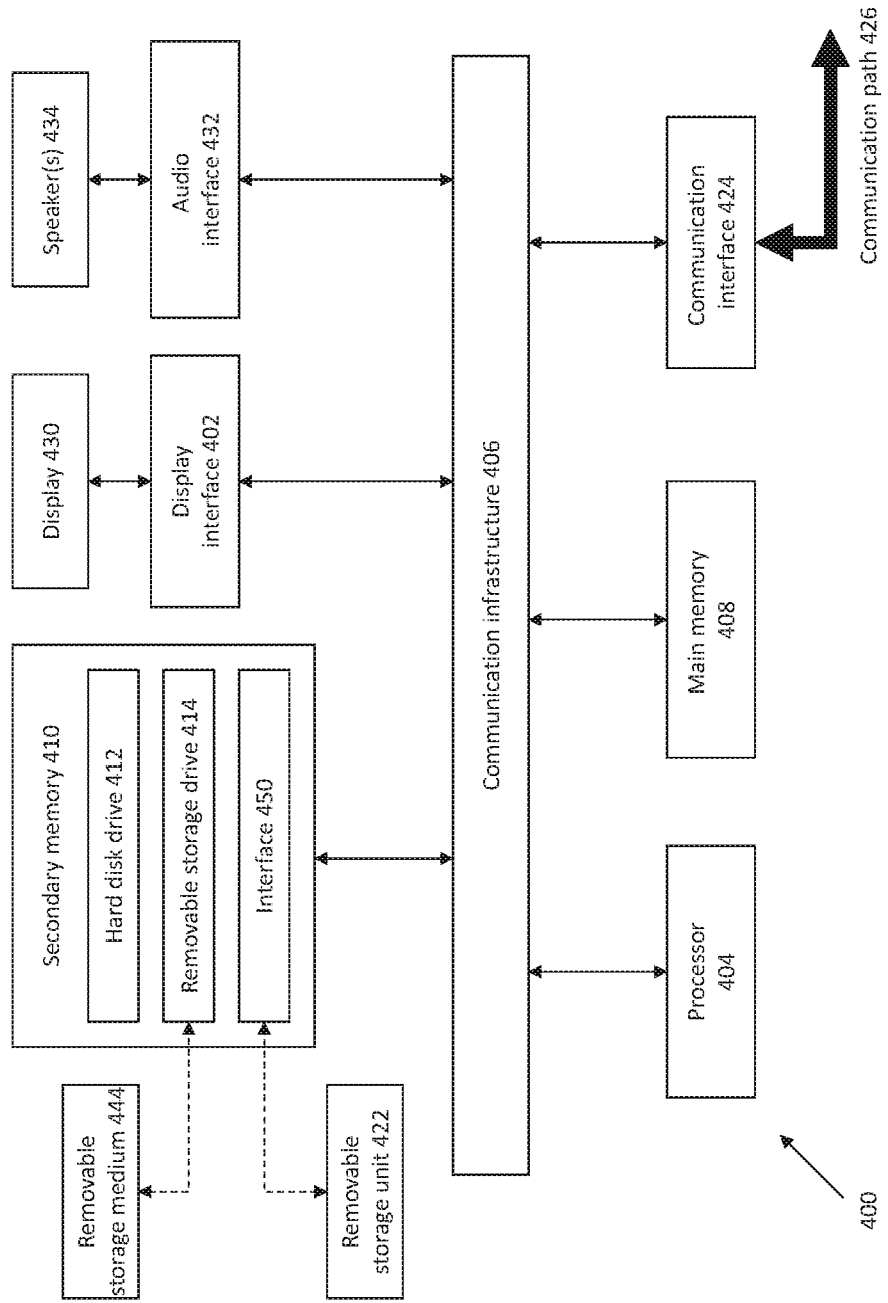
FIG. 4 shows an exemplary computing device to realize a gift card server and a selected participating merchant server in accordance with the system shown in FIGS. 1 and 3.

FIG. 4 depicts an exemplary computing device 400, hereinafter interchangeably referred to as a computer system 400, where one or more such computing devices 400 may be used to execute the above-described method for processing payment using a generic gift card. The exemplary computing device 400 can be used to implement the selected participating merchant server 103 or the gift card server 105, 305. The following description of the computing device 400 is provided by way of example only and is not intended to be limiting.

As shown in FIG. 4, the example computing device 400 includes a processor 404 for executing software routines. Although a single processor is shown for the sake of clarity, the computing device 400 may also include a multi-processor system. The processor 404 is connected to a communication infrastructure 406 for communication with other components of the computing device 400. The communication infrastructure 406 may include, for example, a communications bus, cross-bar, or network.

The computing device 400 further includes a main memory 408, such as a random access memory (RAM), and a secondary memory 410. The secondary memory 410 may include, for example, a storage drive 412, which may be a hard disk drive, a solid state drive or a hybrid drive and/or a removable storage drive 414, which may include a magnetic tape drive, an optical disk drive, a solid state storage drive (such as a USB flash drive, a flash memory device, a solid state drive or a memory card), or the like. The removable storage drive 414 reads from and/or writes to a removable storage medium 444 in a well-known manner. The removable storage medium 444 may include magnetic tape, optical disk, non-volatile memory storage medium, or the like, which is read by and written to by removable storage drive 414. As will be appreciated by persons skilled in the relevant art(s), the removable storage medium 444 includes a non-transitory or transitory computer readable storage medium having stored therein computer executable program code instructions and/or data.

In an alternative implementation, the secondary memory 410 may additionally or alternatively include other similar means for allowing computer programs or other instructions to be loaded into the computing device 400. Such means can include, for example, a removable storage unit 422 and an interface 430. Examples of a removable storage unit 422 and interface 430 include a program cartridge and cartridge interface (such as that found in video game console devices), a removable memory chip (such as an EPROM or PROM) and associated socket, a removable solid state storage drive (such as a USB flash drive, a flash memory device, a solid state drive or a memory card), and other removable storage units 422 and interfaces 430 which allow software and data to be transferred from the removable storage unit 422 to the computer system 400.

The computing device 400 also includes at least one communication interface 424. The communication interface 424 allows software and data to be transferred between computing device 400 and external devices via a communication path 426. In various embodiments of the inventions, the communication interface 424 permits data to be transferred between the computing device 400 and a data communication network, such as a public data or private data communication network. The communication interface 424 may be used to exchange data between different computing devices 400 which such computing devices 400 form part an interconnected computer network. Examples of a communication interface 424 can include a modem, a network interface (such as an Ethernet card), a communication port (such as a serial, parallel, printer, GPIB, IEEE 1394, RJ45, USB), an antenna with associated circuitry and the like. The communication interface 424 may be wired or may be wireless. Software and data transferred via the communication interface 424 are in the form of signals which can be electronic, electromagnetic, optical or other signals capable of being received by communication interface 424. These signals are provided to the communication interface via the communication path 426.

As shown in FIG. 4, the computing device 400 further includes a display interface 402 which performs operations for rendering images to an associated display 430 and an audio interface 432 for performing operations for playing audio content via associated speaker(s) 434.

As used herein, the term "computer program product" may refer, in part, to removable storage medium 444, removable storage unit 422, a hard disk installed in storage drive 412, or a carrier wave carrying software over communication path 426 (wireless link or cable) to communication interface 424. Computer readable storage media refers to any non-transitory, non-volatile tangible storage medium that provides recorded instructions and/or data to the computing device 400 for execution and/or processing. Examples of such storage media include magnetic tape, CD-ROM, DVD, Blu-ray™ Disc, a hard disk drive, a ROM or integrated circuit, a solid state storage drive (such as a USB flash drive, a flash memory device, a solid state drive or a memory card), a hybrid drive, a magneto-optical disk, or a computer readable card such as a PCMCIA card and the like, whether or not such devices are internal or external of the computing device 400. Examples of transitory or non-tangible computer readable transmission media that may also participate in the provision of software, application programs, instructions and/or data to the computing device 400 include radio or infra-red transmission channels as well as a network connection to another computer or networked device, and the Internet or Intranets including e-mail transmissions and information recorded on Websites and the like.

The computer programs (also called computer program code) are stored in main memory 408 and/or secondary memory 410. Computer programs can also be received via the communication interface 424. Such computer programs, when executed, enable the computing device 400 to perform one or more features of embodiments discussed herein. In various embodiments, the computer programs, when executed, enable the processor 404 to perform features of the above-described embodiments. Accordingly, such computer programs represent controllers of the computer system 400.

Software may be stored in a computer program product and loaded into the computing device 400 using the removable storage drive 414, the storage drive 412, or the interface 450. Alternatively, the computer program product may be downloaded to the computer system 400 over the communications path 426. The software, when executed by the processor 404, causes the computing device 400 to perform functions of embodiments described herein.

It is to be understood that the embodiment of FIG. 4 is presented merely by way of example to explain the operation and structure of selected participating merchant server 103 or the gift card server 105, 305. Therefore, in some embodiments one or more features of the computing device 400 may be omitted. Also, in some embodiments, one or more features of the computing device 400 may be combined together. Additionally, in some embodiments, one or more features of the computing device 400 may be split into one or more component parts.

In one embodiment, the computing device 400 is implemented as the server 105, 305 for administering usage of a generic gift card and processing payment using the generic gift card, i.e. the gift card server 105, 305. The gift card server 105, 305 enables the generic gift card 122, 322, 352 to be usable for payment at one or more participating merchants 103. In the present embodiment, the computing device 400 is configured to initialize the generic gift card 122, 322, 352 for payment by generating a unique code 124 in its processor 404. The unique code 124 is for identifying the generic gift card 122, 322, 352 against which payment will be deducted for purchases made at a selected participating merchant 103.

In the present embodiment, the computing device 400 is further configured to transmit the unique code 124 via the communication interface 424 to the selected participating merchant 103. It was earlier described that the payment using the generic gift card 122 for one or more purchases at the selected participating merchant is done by use of the unique code 124, rather than use of the generic gift card 122. As such, when the gift card holder 101, 301, 351 or his delegated third person uses the generic gift card 122 for payment, they may send the unique code 124 to the selected participating merchant server 103 so as to cause the selected participating merchant server 103 to generate an indication of use of the unique code 124. The indication of use of the unique code 124 will then be sent to the computing device 400 via the communication interface 424, wherein the processor 404 calculates and subtracts 104 the amount of the purchases from a balance 126 of the generic gift card 122.

In an implementation, the computing device 400 is further configured to receive the unique code 124 when the purchases are made at the selected participating merchant 103. The receipt of the unique code 124 is for verification against the unique code 124 transmitted to the selected participating merchant 103. The unique code 124 received by the computing device 400 is from the selected participating merchant 103 after the selected participating merchant server 103 has generated the indication of use of the unique code 124.

The computing device 400 may also be further configured to generate an authorization code 128 in response to receiving the unique code 124 from the selected participating merchant 103 when the purchases are made at the selected participating merchant 103. The computing device 400 then transmits the generated authorization code 128 to the selected participating merchant for verification of the received unique code 124.

In a further implementation, the computing device 400 is further configured to create 308 the generic gift card 322 from one or more gift cards 322'. In creating 308 the generic gift card 322, the computing device 400 is further configured to receive 306 an endorsement 314 of conversion of the one or more gift cards 322' from one or more merchants that issue these one or more gift cards 322'. In this implementation, the computing device 400 is further configured to transmit to the one or more merchants that issued the one or more gift cards 322', particulars of the one or more gift cards being created in response to receiving 314 the endorsement 314 of the conversion of the one or more gift cards from the one or more merchants. The computing device 400 is then further configured to receive from the one or more merchants an amount to credit the balance of the generic gift card in response to processing the particulars of the one or more gift cards being created. The computing device 400 may be further configured to extract a balance 326a of one or more gift cards 322' to provide at least a portion of the balance 326 of the generic gift card 322.

In another embodiment, the computing device 400 is implemented as the merchant server 103 for processing payment using a generic gift card 122, the generic gift card 122 being usable for payment across one or more participating merchants. The merchant server 103 for processing payment using the generic gift card 122 is also interchangeably referred to as the selected participating merchant server 103.

In this other embodiment, the communication interface 424 of the computing device 400 is configured to receive, from the server that administers usage of the generic gift card 122 (i.e. the gift card server 105, 305), a unique code 124. Upon receipt, the unique code 124 may be stored in the main memory 408.

When the selected participating merchant server 103 receives an indication of use of the unique code 124, the selected participating merchant server 103 will check whether the unique code 124 received tallies with the unique code 124 stored in the main memory 408. Upon verification, the communication interface 424 will then transmit an indication of use of the unique code 124 to the gift card server 105, 305. As a consequence, the computing device 400 facilitates payment of the purchases at the selected participating merchant to be calculated and subtracted by the processor of the gift card server 105, 305 from a stored balance 126 of the generic gift card 122.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects illustrative and not restrictive.

The invention claimed is:

1. A method for processing payment using a generic gift card, the generic gift card being usable for payment across a plurality of participating merchants, the method being performed at a server that administers usage of the generic gift card, the method comprising:
   receiving, by the server, from an application installed on a mobile device of a gift card holder, a conversion request for converting a plurality of conventional gift cards to a generic gift card;
   upon receiving the conversion request, transmitting, by the server, an endorsement request to a plurality of merchants, each merchant from the plurality of merchants being associated with a gift card from the plurality of gift cards, which the gift card holder is requesting to convert;
   receiving, by the server, in response to the endorsement request, from each of the plurality of merchants, a respective generated incentive value that each merchant requires in return for the conversion;
   forwarding, by the server, to the application installed on the mobile device of the gift card holder, the respective generated incentive value for each of the plurality of merchants to the gift card holder for confirmation and approval for payment of the respective generated incentive values;
   in response to receiving, from the application installed on the mobile device of the gift card holder, approval for payment of the respective generated incentive values, creating, by the server, the generic gift card and assigning an account number to the created generic gift card;
   converting, by the server, a balance associated with each gift card of the plurality of gift cards, to credit the created generic gift card, wherein payment of the incentive value by the gift card holder is by (i) direct payment, or (ii) deduction from the balance;
   receiving, by the server, a notification from the application installed on the mobile device, wherein the notification identifies a particular merchant from among the participating merchants at which gift card holder wishes to transact, wherein said server receives said notification prior to the gift card holder transacting with said particular merchant;
   upon receipt of the notification, generating, by the server, a unique code, wherein the unique code is different from the account number and identifies the generic gift card against which payment will be deducted for purchases made at the particular merchant;
   transmitting, by the server, the unique code to the particular merchant and to the gift card holder prior to any transactions, associated with the generic gift card, occurring at the particular merchant, wherein the unique code is transmitted to the application installed on the mobile device of the gift card holder;
   receiving, by the server, from the particular merchant, an indication of use of the unique code in a transaction by the gift card holder with the particular merchant, said indication of use including the unique code and a value of goods and/or services associated with the transaction, wherein no physical generic gift card is present;
   upon receiving the indication of use of the unique code from the particular merchant, calculating and subtracting the value associated with the transaction from a balance of the generic gift card.

2. The method of claim 1, further comprising:
   verifying, by the server, the unique code received in the indication of use against the unique code generated by the server and transmitted to the particular merchant.

3. The method of claim 2, further comprising:
   receiving, by the server, an authorization code, from the particular merchant, the authorization code being generated, by the particular merchant, in response to the unique code received when the purchases are made at the particular merchant.

4. The method of claim 1, further comprising:
   generating, by the server, an authorization code for verification of the unique code; and
   transmitting, by the server, the authorization code to the particular merchant for verification of the received unique code by the gift card holder.

5. The method of claim 3, wherein the authorization code is generated by the selected participating merchant for subsequent verification of the received unique code.

6. The method of claim 1, wherein the endorsement request includes particulars of the each associated gift card being converted.

7. The method of claim 1, wherein at least a portion of the balance of the generic gift card is extracted from a balance of a gift card from the plurality of gift cards.

8. A server for administering usage of a generic gift card and processing payment using the generic gift card, the generic gift card being usable for payment across a plurality of participating merchants, the server comprising:
- at least one processor;
- at least one memory including computer program code; and
- at least one communication interface;
- the at least one memory and the computer program code configured to, with at least one processor, cause the server at least to:
  - receive, from an application installed on a mobile device of a gift card holder, a conversion request for converting a plurality of conventional gift cards to a generic gift card;
  - upon receiving the conversion request, transmit an endorsement request to a plurality of merchants, each merchant from the plurality of merchants being associated with a gift card, from the plurality of gift cards, which the gift card holder is requesting to convert;
  - receive, in response to the endorsement request, from each of the plurality of merchants, a respective generated incentive value that each merchant requires in return for the conversion;
  - forward, to the application installed on the mobile device of the gift card holder, the respective generated incentive value for each of the plurality of merchants to the gift card holder for confirmation and approval for payment of the respective generated incentive values;
  - in response to receiving, from the application installed on the mobile device of the gift card holder, approval for payment of the respective generated incentive values, create the generic gift card and assign an account number to the created generic gift card;
  - convert a balance associated with each gift card of the plurality of gift cards, to credit the created generic gift card, wherein payment of the incentive value by the gift card holder is by (i) direct payment, or (ii) deduction from the balance;
  - receive a notification from the application installed on the mobile device, wherein the notification identifies a particular merchant from among the participating merchants at which gift card holder wishes to transact, wherein said server receives said notification prior to the gift card holder transacting with said particular merchant;
  - upon receipt of the notification, generate a unique code, wherein the unique code is different from the account number and identifies the generic gift card against which payment will be deducted for purchases made at the particular merchant;
  - transmit the unique code to the particular merchant and to the gift card holder prior to any transactions, associated with the generic gift card, occurring at the particular merchant, wherein the unique code is transmitted to the application installed on the mobile device of the gift card holder;
  - receive from the particular merchant, an indication of use of the unique code in a transaction by the gift card holder with the particular merchant, said indication of use including the unique code and a value of goods and/or services associated with the transaction, wherein no physical generic gift card is present;
  - upon receiving the indication of use of the unique code from the particular merchant, calculate and subtract the value associated with the transaction from a balance of the generic gift card.

9. The server of claim 8, wherein the server is further configured to:
- verify the unique code received in the indication of use against the unique code generated by the server and transmitted to the particular merchant.

10. The server of claim 9, wherein the server is further configured to:
- generate an authorization code in response to receiving the unique code from the particular merchant when the purchases are made at the particular merchant; and
- transmit the authorization code to the particular merchant for verification of the received unique code by the gift card holder.

11. The server of claim 8, wherein the conversion request includes particulars of each associated gift card being converted.

12. The server of claim 8, wherein the server is further configured to:
- extract a balance of one or more gift cards of the plurality of gift cards to provide at least a portion of the balance of the generic gift card.

13. A non-transitory computer readable medium having stored thereon executable instructions for controlling a computer to administer usage of a generic gift card being usable for payment across a plurality of participating merchants and process payment using the generic gift card, wherein the computer is controlled to perform steps comprising:
- receiving from an application installed on a mobile device of a gift card holder, a conversion request for converting a plurality of conventional gift cards to a generic gift card;
- upon receiving the conversion request, transmitting an endorsement request to a plurality of merchants, each merchant from the plurality of merchants being associated with a gift card from the plurality of gift cards, which the gift card holder is requesting to convert;
- receiving, in response to the endorsement request, from each of the plurality of merchants, a respective generated incentive value that each merchant requires in return for the conversion;
- forwarding, to the application installed on the mobile device of the gift card holder, the respective generated incentive value for each of the plurality of merchants to the gift card holder for confirmation and approval for payment of the respective generated incentive values;
- in response to receiving, from the application installed on the mobile device of the gift card holder, approval for payment of the respective generated incentive values, creating the generic gift card and assigning an account number to the created generic gift card;
- converting a balance associated with each gift card of the plurality of gift cards, to credit the created generic gift card, wherein payment of the incentive value by the gift card holder is by (i) direct payment, or (ii) deduction from the balance;
- receiving a notification from the application installed on the mobile device, wherein the notification identifies a particular merchant from among the participating merchants at which gift card holder wishes to transact, wherein said server receives said notification prior to the gift card holder transacting with said particular merchant;

upon receipt of the notification, generating a unique code, wherein the unique code is different from the account number and identifies the generic gift card against which payment will be deducted for purchases made at the particular merchant;

transmitting the unique code to the particular merchant and to the gift card holder prior to any transactions, associated with the generic gift card, occurring at the particular merchant, wherein the unique code is transmitted to the application installed on the mobile device of the gift card holder;

receiving from the particular merchant, an indication of use of the unique code in a transaction by the gift card holder with the particular merchant, said indication of use including the unique code and a value of goods and/or services associated with the transaction, wherein no physical generic gift card is present;

upon receiving the indication of use of the unique code from the particular merchant, calculating and subtracting the value associated with the transaction from a balance of the generic gift card.

\* \* \* \* \*